(No Model.) 4 Sheets—Sheet 1.
F. M. DRAKE.
MACHINE FOR SCOURING WHEAT.
No. 375,612. Patented Dec. 27, 1887.
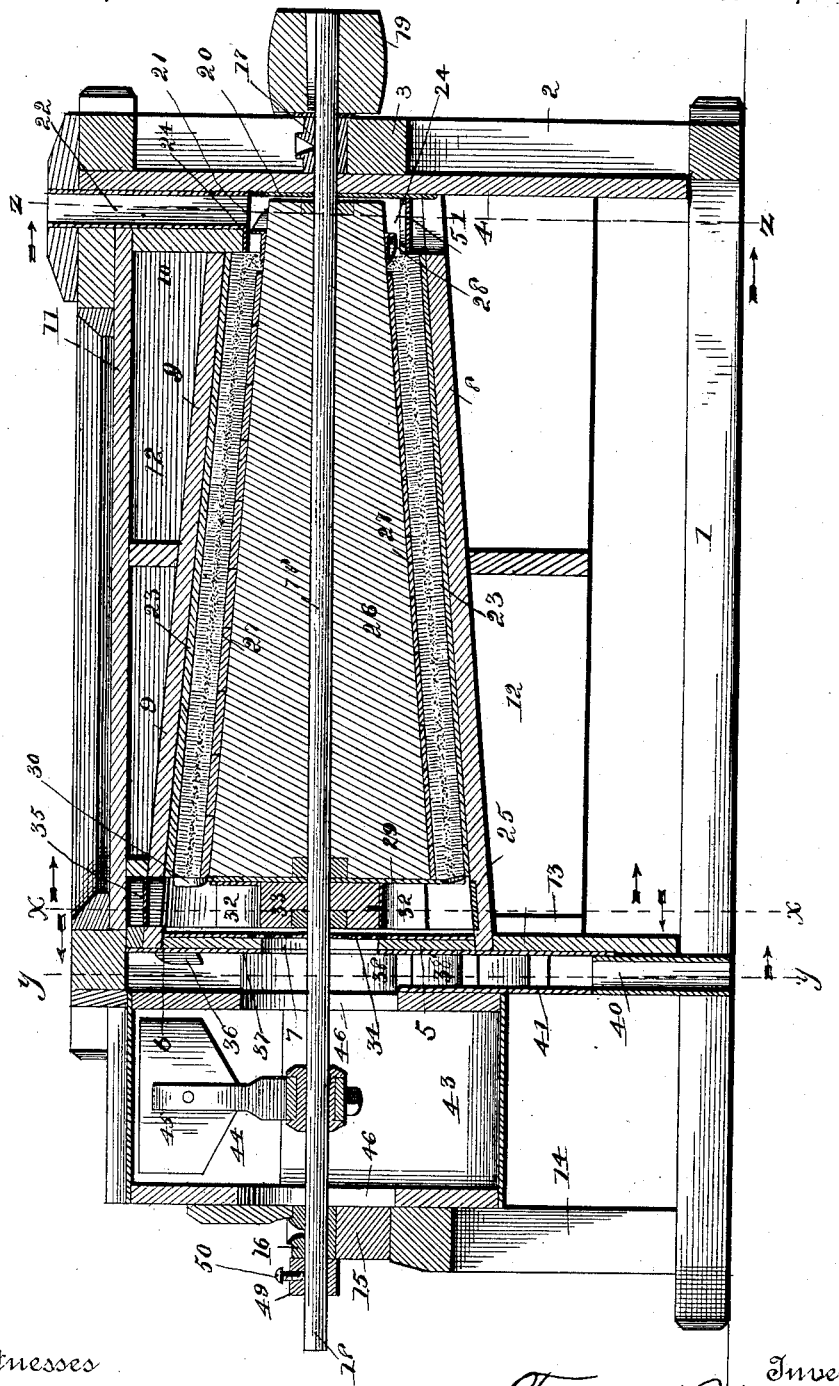
Witnesses
F. L. Ourand.
Benj. G. Cowl.
Inventor
Francis M. Drake,
By his Attorneys
Louis Bagger & Co.

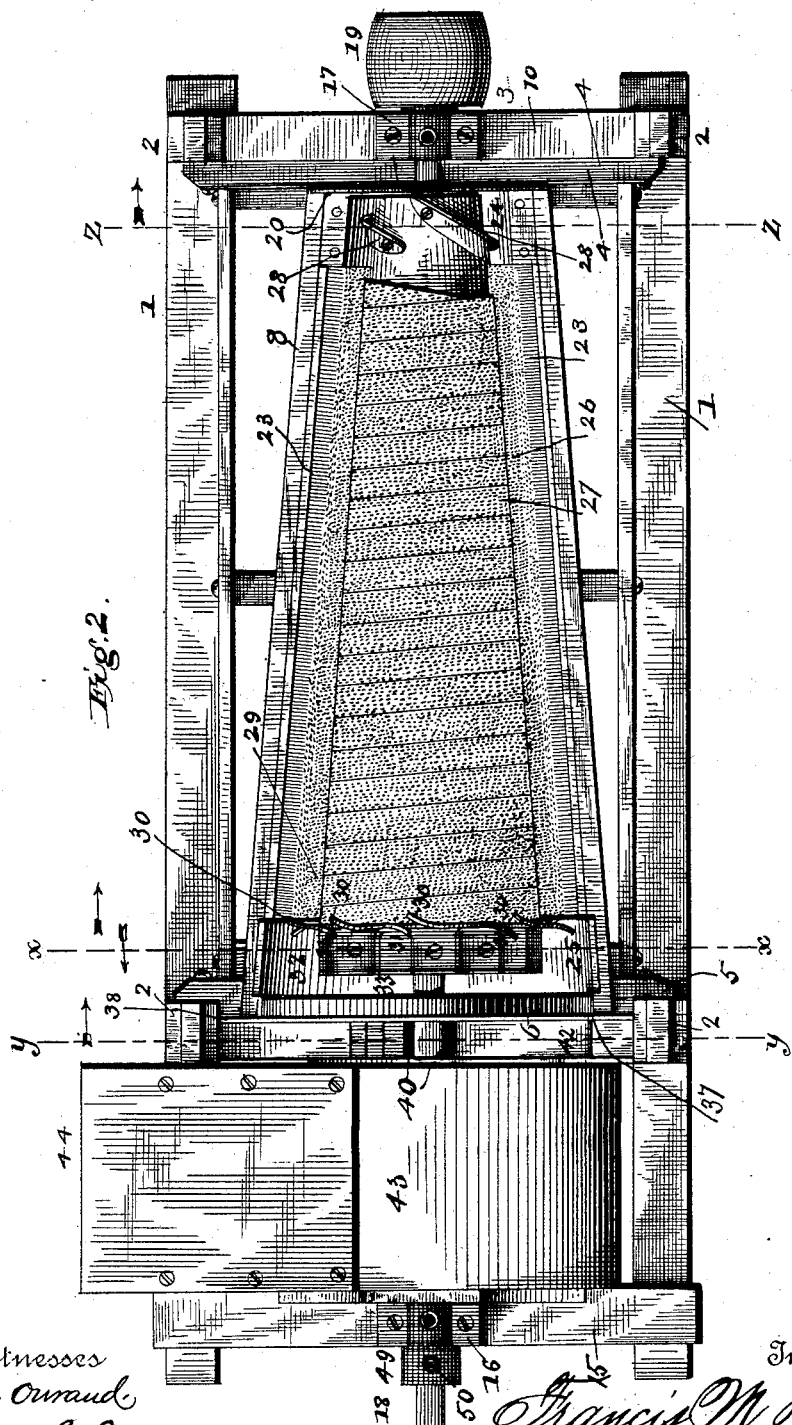

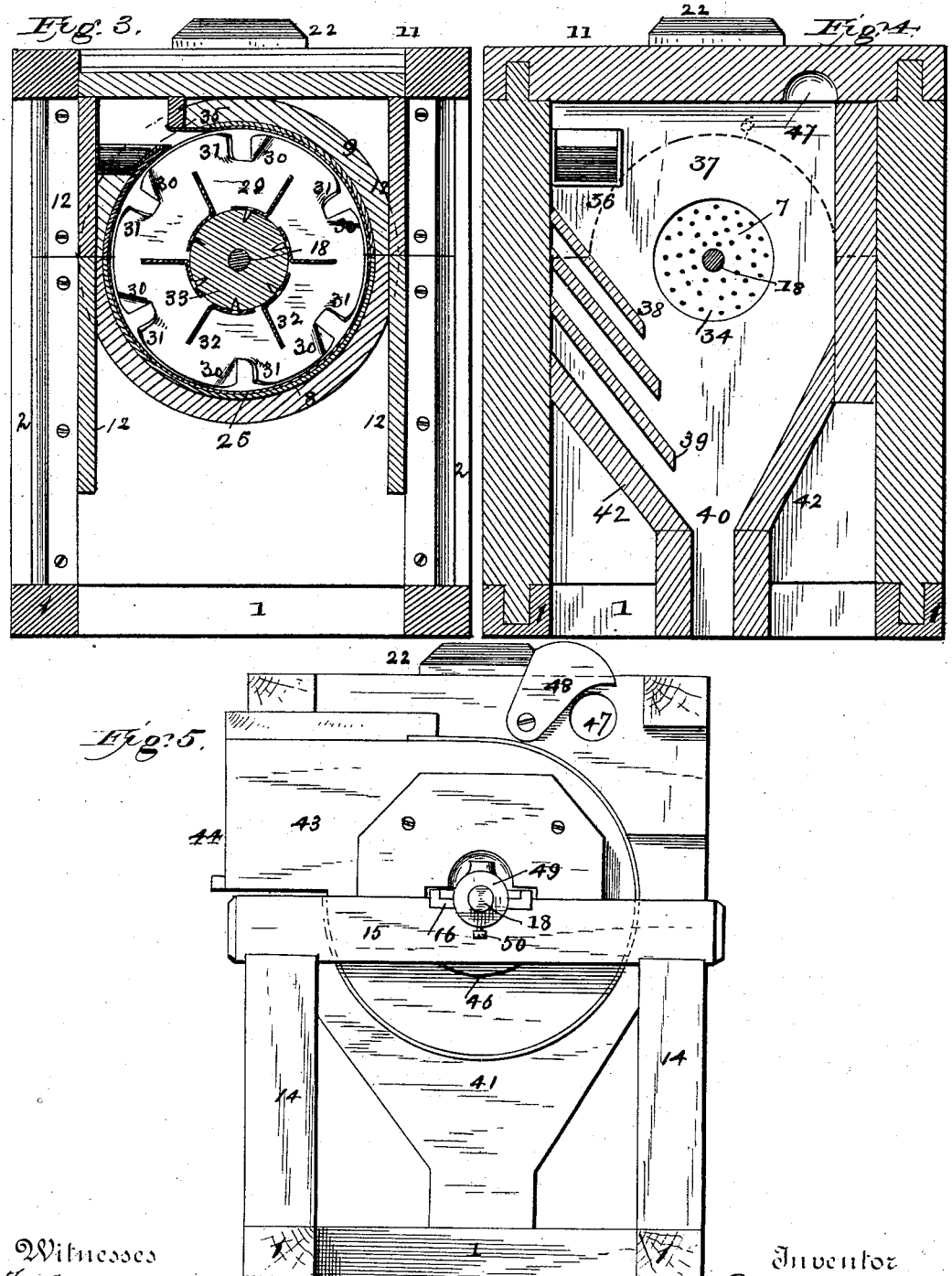

(No Model.) 4 Sheets—Sheet 4.

F. M. DRAKE.
MACHINE FOR SCOURING WHEAT.

No. 375,612. Patented Dec. 27, 1887.

WITNESSES
F. L. Ourand
Wm Lecher

INVENTOR
F. M. Drake
by L. Bagger & Co.
Attorneys

UNITED STATES PATENT OFFICE.

FRANCIS M. DRAKE, OF WALDO, OHIO.

MACHINE FOR SCOURING WHEAT.

SPECIFICATION forming part of Letters Patent No. 375,612, dated December 27, 1887.

Application filed January 24, 1887. Serial No. 225,320. (No model.)

*To all whom it may concern:*

Be it known that I, FRANCIS M. DRAKE, a citizen of the United States, and a resident of Waldo, in the county of Marion and State of Ohio, have invented certain new and useful Improvements in Machines for Scouring Wheat; and I do hereby declare that the following is a full, clear, and exact description of the invention, which will enable others skilled in the art to which it appertains to make and use the same, reference being had to the accompanying drawings, which form a part of this specification, and in which—

Figure 6:
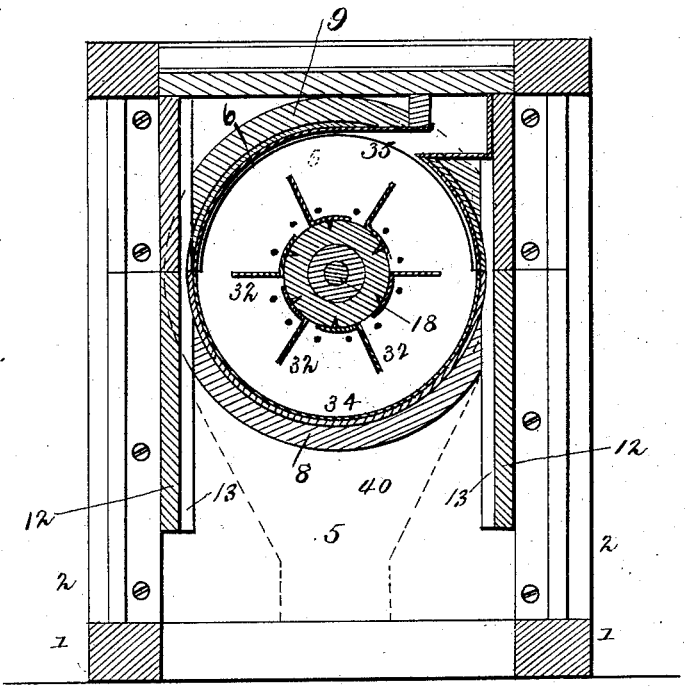
Figure 7:
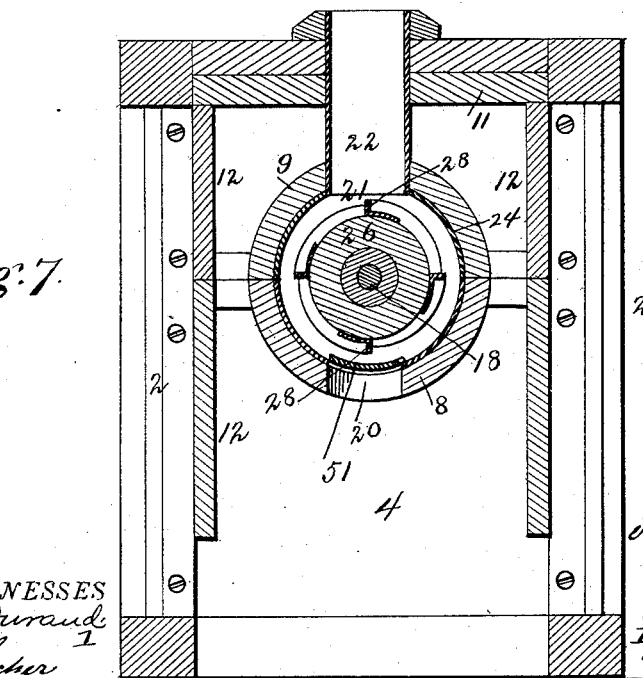

Figure 1 is a longitudinal vertical sectional view of my improved grain-scouring machine. Fig. 2 is a top plan view of the same with the upper portion of the casing removed. Fig. 3 is a transverse sectional view on lines $x\ x$, Figs. 1 and 2, looking toward the feed end of the machine. Fig. 4 is a similar view on lines $y\ y$, Figs. 1 and 2, and looking toward the larger perforated head of the casing. Fig. 5 is a view of the rear or discharge end of the machine. Fig. 6 is a transverse vertical sectional view on lines $x\ x$, Figs. 1 and 2, looking toward the large perforated head of the casing; and Fig. 7 is a similar view on lines $z\ z$, Figs. 1 and 2, looking toward the small head of the casing.

Similar numerals of reference indicate corresponding parts in all the figures.

My invention has relation to that class of grain-scouring machines in which the grain is scoured between a revolving cone covered with suitable brushing material and a correspondingly-covered casing, and in which a current of air is created within the machine, removing the beard, cuticle, and impurities scoured off the grain; and it consists in the improved construction and combination of parts of such a machine, in which the grain is fed into the small end of a conical casing covered upon its inside with card-cloth or wire brush and having a cone revolving within it covered in a similar manner, and in which the scoured grain is thrown by means of buckets or paddles from the casing into a passage, where it is exposed to the current of air created by suction from a fan, whereupon it is allowed to pass out of the machine, as hereinafter more fully described and claimed.

In the accompanying drawings, the numeral 1 indicates sills, to which upright corner-posts 2 are secured with their lower ends, the said corner-posts being connected by a cross-piece, 3, at one end of the frame and by a wall, 4, at the same end, and by a partition, 5, at the other end of the frame, the said partition having a semicircular upper edge, 6, and a circular aperture, 7, concentric with the said edge.

A conical casing, divided longitudinally and horizontally into halves 8 and 9, is supported between the ends of the frame, the lower half, 8, of the casing being secured to the cross-piece and wall with its narrow end, and with its wide end to the partition having the semicircular upper edge, the said upper edge of the end piece or partition being cut off into its semi-circular shape with the same radius as the interior radius of the wide end of the casing. The upper half, 9, of the casing is secured to an end piece, 10, at its narrow end and at the top to a top frame, 11, the said top frame having suitable side pieces, 12, and vertical guide-cleats 13, with which it may be secured between and to the upper portions of the corner-posts, fitting to the lower half, the larger rear end of the upper half fitting upon the semicircular edge of the partition, as clearly shown in Fig. 6 of the drawings. Two shorter uprights or posts, 14, are secured to the sills at a distance from the posts supporting the larger end of the casing, and the upper ends of these short posts are connected by a cross-piece, 15, which has a box or bearing, 16, upon its middle in line with a similar box or bearing, 17, upon the cross-piece at the narrow end of the casing, and a shaft, 18, is journaled in these bearings and has a drive-pulley, 19, upon the forward end or the end at the narrow end of the casing.

The narrow or smaller end of the casing is provided with a circular metallic head, 20, or plate, which is secured between the end of the lower half of the casing and the wall of the frame, and the upper edge of the said head is inserted between the end of the upper half of the casing and the end piece of the top frame. The feed-channel 22 passes down through the upper half of the casing, having its lower end entering the upper half of the casing through an opening, 21, in the same. The interior of both halves of the casing is covered with card-cloth or wire brush, as shown at 23, the said covering extending from near the feed end, where a space is provided with a smooth metallic lining, 24, to near the wide discharge end, where a similar smooth metallic lining, 25, is secured.

A conical runner or scouring-cone, 26, is secured upon the shaft, and has a spiral strip, 27, of card-cloth or wire brush secured to its surface, the said strip covering the scouring-cone from its larger end to a distance from the small end equal to the smooth portion of the casing, and the portion of the scouring cone at that end which is not covered by the strip is provided with spiral feeding-flanges or forcing-flanges 28, serving to feed or force the grain into the space between the brush-surfaces of the cone and casing.

The large end of the scouring-cone is provided with a metallic disk, 29, having notches cut into its projecting flange or edge and extending to the face of the cone, the said notches or slits being radiating, and the edges 30 and 31 of these radiating slits are bent, respectively, toward the feed and discharge end of the casing, so that they will feed the grain, as it is forced rearward by the spiral brush upon the cone, out at the larger end of the same into a space formed between the end of the cone and the rear head of the casing.

Paddles or buckets 32 are formed radiating from a cylinder, 33, upon the shaft, and fill the space between the end of the scouring-cone and the head of the casing, and the said head is provided with a perforated metallic disk, 34, which covers the aperture in the head or end piece of the casing, the shaft passing through the said disk.

The upper half of the casing is formed at its top with a passage, 35, opening at the wide end of the casing and extending into a rearwardly and downwardly inclined chute, 36, which projects through a metallic plate, 37, secured between the corner-posts. An inclined cleat or board, 38, is secured to the rear face of this plate extending from one corner-post below the chute, and another inclined cleat or board, 39, is secured to this plate below the upper board, and extends to a discharge-chute, 40, at the bottom of the frame. A number of inclined cleats or boards may be secured between the upper and lower inclined boards, forming steps, the lower end of each board or cleat being a distance above the board or cleat below, so that the grain in falling from one board or cleat to another may be perfectly spread and subjected to the current of air passing through the machine. A plate, 41, is secured to the outer edges of the inclined boards or cleats, forming a chamber, and cleats 42 close the chamber at the other side.

A fan-casing, 43, having its outlet-aperture 44 opening at the side or at any other suitable point of the same, is secured at the outer side of the chamber, closing the upper portion of the outer side of the same, and this fan-casing has a fan, 45, secured to the shaft within it and revolving within the casing, and has its inlet-aperture 46 opening into the chamber and registering with the perforated plate or disk covering the aperture in the head of the scouring-casing. The upper portion of the chamber having the inclined boards or cleats is formed with an aperture, 47, extending through the rear end of the top frame, and this aperture is provided with a pivoted door or gate, 48, by means of which the aperture may be more or less opened or closed, and by means of which the inlet of air into the chamber may be regulated or cut off.

The rear end of the shaft is provided with an adjustable collar, 49, having a set-screw, 50, by means of which the longitudinal play of the shaft may be prevented, and by means of which and the drive-pulley 19 the shaft may be adjusted so as to bring the brush-surface of the scouring-cone nearer to or farther from the brush-surface of the casing by drawing the shaft farther forward or rearward.

The bottom of the lower half of the scouring-casing is provided at the smaller end of the same with a door, 51, which may be opened and allow the grain to drop out if the scouring-cone by accident is revolved in the wrong direction, feeding the grain back toward the feed end instead of toward the discharge end.

It will now be seen that when grain is fed into the feed-aperture and the shaft and scouring-cone revolved, the spiral feed-flanges on the smaller end of the cone will force the grain between the brush-surfaces of the latter and of the conical casing, subjecting the grain to the scouring action of the same, the said scouring increasing in velocity as the grain passes toward the larger discharge end of the scourer on account of the increasing diameter of the cone, the grain being fed toward that end by the spiral strip upon the same. As the scoured grain now arrives at the flange at the larger end of the cone, the oblique or spiral flanges or edges of the notches in the said flange will feed the grain to the paddles or buckets, which will throw the grain upward into the discharge-passage, through which passage and the inclined chute the grain will pass, dropping down upon the inclined cleats or boards, being spread in falling from each cleat or step, so that it will be subjected to the current of air created by the suction of the fan, the said current removing all particles of beard or cuticle scoured off the wheat or other grain, as well as other impurities, and forcing them out at the discharge-aperture of the fan, while the cleaned grain will drop down into the discharge-chute and be carried off to its destination by suitable means.

A current of air is likewise created in the casing between the latter and the scouring-cone by the air being drawn through the perforated plate at the discharge-head of the casing, so that the light particles of beard or cuticle, as well as impurities and dust, will be prevented from settling in the brush-surfaces.

By adjusting the shaft of the scouring-cone lengthwise the space between the latter and the surface of the casing may be changed, a larger space being at times desirable for scouring larger grain or grain having a very thin cuticle, and vice versa, and when the wires of the card-cloth or brushes become worn, the scouring-cone may be moved toward the narrower end of the casing, together with the shaft, bringing the ends of the wires in their proper relative positions toward each other, the collar upon the rear end of the shaft and the drive-pulley upon the forward end serving to adjust the shaft and cone in the proper positions.

Having thus described my invention, I claim and desire to secure by Letters Patent of the United States—

1. In a grain-scouring machine, the combination of a conical casing having a feed-aperture at its smaller end and the discharge at the larger end, and having smooth portions at the ends and provided with a covering of card-cloth or wire brush upon the inside between the smooth portions, with a revolving scouring-cone having a smooth smaller end provided with spiral feed or forcing flanges and having a spiral strip of card-cloth or wire brush on its surface, and provided at its large end with a flange having notches or slits formed with obliquely or spirally bent edges, as and for the purpose shown and set forth.

2. In a grain-scouring machine, the combination of a conical casing having an interior covering of card-cloth, and having a smooth portion or inner surface at the discharge end, formed with a discharge-aperture in its top, with a conical runner or scouring-cone covered with card-cloth and having a flange at its rear end formed with notches or slits having obliquely or spirally bent edges, and a cylinder formed with radiating paddles or buckets, as shown, and for the purpose set forth.

3. In a grain-scouring machine, the combination of a scouring-chamber having a downwardly-inclined discharge-spout at the upper portion of its rear end and having a perforated rear head, a chamber at the rear end of the scouring-chamber having a discharge-chute at its lower end and having a series of boards or steps below the discharge-spout, one below the other and inclined toward the discharge-chute, and having an air-inlet at its upper end provided with a pivoted gate, and a suction-fan having its inlet-aperture in the side of the said chamber, as and for the purpose shown and set forth.

In testimony that I claim the foregoing as my own I have hereunto affixed my signature in presence of two witnesses.

FRANCIS M. DRAKE.

Witnesses:
LOUIS BAGGER,
CHARLES N. ZIMMERMAN.